(12) United States Patent
Hara et al.

(10) Patent No.: US 11,728,904 B2
(45) Date of Patent: Aug. 15, 2023

(54) WIRELESS COMMUNICATION SYSTEM, WIRELESS COMMUNICATION METHOD AND WIRELESS TERMINAL EQUIPMENT

(71) Applicant: NIPPON TELEGRAPH AND TELEPHONE CORPORATION, Tokyo (JP)

(72) Inventors: Kazutaka Hara, Musashino (JP); Tomohiro Taniguchi, Musashino (JP); Ryota Shiina, Musashino (JP); Tomoki Murakami, Musashino (JP); Toshiro Nakahira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 39 days.

(21) Appl. No.: 17/624,534

(22) PCT Filed: Jul. 4, 2019

(86) PCT No.: PCT/JP2019/026745
§ 371 (c)(1),
(2) Date: Jan. 3, 2022

(87) PCT Pub. No.: WO2021/002024
PCT Pub. Date: Jan. 7, 2021

(65) Prior Publication Data
US 2022/0255634 A1     Aug. 11, 2022

(51) Int. Cl.
*H04B 10/00* (2013.01)
*H04B 10/85* (2013.01)
(Continued)

(52) U.S. Cl.
CPC ............ *H04B 10/85* (2013.01); *H04W 12/06* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

| | | | |
|---|---|---|---|
| 2013/0036231 A1* | 2/2013 | Suumaki ............... | H04W 12/04 709/228 |
| 2014/0186026 A1* | 7/2014 | Oshima .................. | H04N 23/73 398/118 |
| 2018/0139202 A1 | 5/2018 | Sethi et al. | |

OTHER PUBLICATIONS

Mengjie Zhang et al., 4.05-Gb/s RGB LED-based VLC system utilizing PS-Manchester coded Nyquist PAM-8 modulation and hybrid time-frequency domain equalization, OFC2017, Mar. 19, 2017.

(Continued)

*Primary Examiner* — Daniel G Dobson
(74) *Attorney, Agent, or Firm* — Harness, Dickey & Pierce, P.L.C.

(57) ABSTRACT

In the present disclosure, a wireless base station apparatus sends out continuous light having a predetermined characteristic to a wireless terminal apparatus, and the wireless terminal apparatus selects authentication information corresponding to the predetermined characteristic, and transmits the authentication information to the wireless base station apparatus by RF wireless. When confirming that the received authentication information matches authentication information corresponding to the predetermined characteristic, the wireless base station apparatus permits information communication between the wireless terminal apparatus and an upper network.

8 Claims, 3 Drawing Sheets

(51) Int. Cl.
*H04W 12/06* (2021.01)
*H04J 14/00* (2006.01)

(58) Field of Classification Search
CPC ............ H04B 10/1127; H04B 10/1129; H04B 10/114; H04B 10/1141; H04B 10/1143; H04B 10/1149; H04B 10/116; H04B 10/118
See application file for complete search history.

(56) References Cited

OTHER PUBLICATIONS

Wen-Shing Tsai et al., A 50 m/320 Gbps DWDM FSO communication, IEEE Photonics Conference (IPC), Oct. 2, 2016, pp. 43-44.

* cited by examiner

| INTENSITY | SSID | PASSWORD |
|---|---|---|
| L < INTENSITY ≤ M | AAAAA | aaaa |
| M < INTENSITY ≤ N | BBBBB | bbbb |

| INTENSITY | SSID | PASSWORD |
|---|---|---|
| P < SPECTRAL INTENSITY AT 300 nm | CCCCC | cccc |
| Q < SPECTRAL INTENSITY AT 900 nm | DDDDD | dddd |

| INTENSITY | SSID | PASSWORD |
|---|---|---|
| R1 < SPECTRAL INTENSITY AT 450 nm ≤ R2<br>S1 < SPECTRAL INTENSITY AT 550 nm ≤ S2<br>T1 < SPECTRAL INTENSITY AT 630 nm ≤ T2 | EEEEE | eeee |
| U1 < SPECTRAL INTENSITY AT 450 nm ≤ U2<br>V1 < SPECTRAL INTENSITY AT 550 nm ≤ V2<br>W1 < SPECTRAL INTENSITY AT 630 nm ≤ W2 | FFFFF | ffff |

| WAVELENGTH CHANGE | SSID | PASSWORD |
|---|---|---|
| 630 nm → 450 nm → 550 nm → 450 nm → 550 nm | JJJJJ | jjjj |
| 630 nm → 550 nm → 450 nm → 630 nm → 550 nm | KKKKK | kkkk |

WIRELESS COMMUNICATION SYSTEM, WIRELESS COMMUNICATION METHOD AND WIRELESS TERMINAL EQUIPMENT

CROSS-REFERENCE TO RELATED APPLICATIONS

This application is a 371 U.S. National Phase of International Application No. PCT/JP2019/026745 filed on Jul. 4, 2019. The entire disclosure of the above application is incorporated herein by reference.

TECHNICAL FIELD

The present disclosure relates to a wireless communication system, a wireless communication method, and a wireless terminal apparatus for opening up a channel of RF (radio frequency) wireless between a wireless base station apparatus and the wireless terminal apparatus using optical wireless for authentication.

BACKGROUND ART

High-speed Internet services using FTTH (fiber-to-the-home) and LTE (long term evolution) have become indispensable tools in daily life. Especially in recent years, with the spread of cloud use and the expansion of mobile terminal use, not only IP data communication but also a wide variety of applications and services such as IoT (internet of things)/M2M (machine to machine), 4K/8K high-definition video distribution services, online video distribution services, video uploading through SNSs have rapidly become widespread. Furthermore, new work styles such as telework utilizing ICT have been proposed, and it is expected that demand for services using networks will continue to grow in the future. Currently, with the spread of FTTH, stable optical broadband service has been provided into the home, while wireless communication methods have become the mainstream in the home environment from the viewpoints of utilizing multiple devices other than PCs and handling cable wiring, and from the background of diversification of services mentioned above.

From the viewpoint of the frequency range, wireless communication systems can be roughly divided into two types with 3 THz as the boundary. The frequency band of 3 THz or lower is called the radio wave range, and examples include cellular systems such as LTE and 5G, and wireless LANs using unlicensed bands. Research and development is active in this area, and higher throughput can be achieved by expanding the used frequency band or using the higher frequency band.

On the other hand, the frequency band of 3 THz or higher (30 PHz or lower) is called the light wave range, and examples include systems using infrared light or visible light, and in recent years, Li-Fi that performs transmission and reception by modulating an LED used in lighting at high speed. Examples at the research level include a transmission experiment at 1 m/4 Gbps using WDM (wavelength division multiplexing) with LED, which is incoherent light, and 8 PAM, and a report of 50 m/320 Gbps by 8-wavelength DWDM (Dense WDM) at 50 GHz intervals using coherent light (Non-Patent Literatures 1 and 2).

Wireless communication systems in the radio wave range and the light wave range have different characteristics due to the difference between the utilized frequency bands. For example, a wireless communication system in the light wave range has a narrow coverage area due to extremely high directivity. A wireless communication system in the radio wave range has a wide coverage area due to the diffraction and transmission characteristics of radio waves. Since these wireless communication systems have contrasting coverage area characteristics, a hybrid-type wireless communication system using the radio wave range and the light wave range is conceivable that complements each other's characteristics in terms of the limitation of the communication area, the safety of communication, the stability of communication, and the like.

Such a system has already been proposed, for example, the invention of Patent Literature 1 is a hybrid-type wireless communication system using visible light communication and Wi-Fi communication that aims to improve the convenience of Wi-Fi communications for end-users, and enables Wi-Fi communication only in a specific area. A method has been disclosed in which authentication information for accessing a network such as an SSID (service set identifier), a password/PMK (pairwise master key), a BSSID (basuic SSID), an ESSID (extended SSID), and a channel is sent from a wireless base station apparatus to a wireless terminal apparatus through visible light communication, the authentication information is received by a photodetector mounted on the wireless terminal apparatus, and an authentication server performs authentication through Wi-Fi communication between the wireless base station apparatus and the wireless terminal apparatus based on the received authentication information, thereby establishing communication.

CITATION LIST

Patent Literature

Patent Literature 1: US2018/0139202A1

Non-Patent Literature

Non-Patent Literature 1: Mengjie Zhang; Meng Shi; Fumin Wang; Jiaqi Zhao; Yingjun Zhou; Zhixin Wang; Nan Chi, '4.05-Gb/S RGB LED-based VLC system utilizing PS-Manchester coded Nyquist PAM-8 modulation and hybrid time-frequency domain equalization', W2A.42, Proc OFC2017

Non-Patent Literature 2: Wen-Shing Tsai; Hai-Han Lu; Chung-Yi Li; Ting-Chieh Lu; Hung-Hsien Lin; Bo-Rui Chen; Chang-Jen Wu, 'A 50 m/320 Gbps DWDM FSO communication', 2016 IEEE Photonics Conference (IPC), p. 43-44

SUMMARY OF THE INVENTION

Technical Problem

In Patent Literature 1, a visible light source arranged in the wireless base station apparatus transmits authentication information such as an SSID and a password on an optical modulation signal. Examples of optical modulation for transmitting authentication information such as an SSID and a password include a method of direct modulation for driving an electrical signal of authentication information by current via a driver circuit for modulation, and a method of performing modulation by changing physical quantities of light (e.g., intensity and phase) using an optical device called an external modulator. In either case, cost increases by the modulation circuit or the external modulator, so it cannot be said to be an economical system. Further, the wireless terminal apparatus requires a demodulation circuit for demodulating the received optical modulation signal, so it cannot be said to be an economical system.

Therefore, in order to solve the above problems, the present disclosure provides an RF/optical wireless hybrid-type wireless communication system that complements each other's characteristics of RF wireless that uses the radio wave range and optical wireless that uses the light wave range, and aims to ensure the limitation of the communication area, the safety of communication, and the stability of communication. Furthermore, the present disclosure aims to implement a wireless communication system including a wireless base station apparatus and a wireless terminal apparatus having simple configurations.

Means for Solving the Problem

The present disclosure is to solve the above problems, and a wireless base station apparatus sends out continuous light having a predetermined characteristic to a wireless terminal apparatus, and the wireless terminal apparatus selects authentication information corresponding to the predetermined characteristic, and transmits the authentication information to the wireless base station apparatus by RF wireless. When confirming that the received authentication information matches authentication information corresponding to the predetermined characteristic, the wireless base station apparatus permits information communication between the wireless terminal apparatus and an upper network.

A wireless communication system according to the present disclosure includes:
 a wireless base station apparatus; and
 a wireless terminal apparatus that performs RF wireless communication with the wireless base station apparatus using continuous light from the wireless base station apparatus for authentication,
  wherein the wireless base station apparatus includes:
  a light generation circuit that generates continuous light having a predetermined characteristic;
  a beam controller that controls a beam shape of the continuous light from the light generation circuit, and sends out the continuous light into space;
  a base station-side RF receiver that receives authentication information from the wireless terminal apparatus by RF wireless; and
  an authentication control circuit that permits information communication between the wireless terminal apparatus and an upper network when authenticating the wireless terminal apparatus according to a predefined authentication protocol based on the authentication information from the base station-side RF receiver, and
  the wireless terminal apparatus includes:
  a light receiver that receives the continuous light from the beam controller;
  a continuous light determination circuit that determines the predetermined characteristic of the continuous light received by the light receiver;
  an authentication information database circuit that selects authentication information according to the determination by the continuous light determination circuit;
  an authentication execution circuit that executes the predefined authentication protocol based on the authentication information from the authentication information database circuit; and
  a terminal-side RF transmitter that transmits the authentication information from the authentication execution circuit to the base station-side RF receiver by RF wireless.

A wireless communication method according to the present disclosure includes in the following order:
 a step of a wireless base station apparatus
  generating continuous light having a predetermined characteristic, and
  controlling a beam shape of the generated continuous light and sending out the continuous light into space;
 a step of a wireless terminal apparatus
  receiving the sent-out continuous light,
  determining the predetermined characteristic of the received continuous light,
  selecting authentication information according to the determination,
  executing a predefined authentication protocol based on the selected authentication information, and
  transmitting the selected authentication information to the wireless base station apparatus by RF wireless; and
 a step of the wireless base station apparatus
  receiving the authentication information from the wireless terminal apparatus by RF wireless, and
  permitting information communication between the wireless terminal apparatus and an upper network when authenticating the wireless terminal apparatus according to the predefined authentication protocol based on the received authentication information.

A wireless terminal apparatus according to the present disclosure includes:
 a light receiver that receives continuous light from space;
 a continuous light determination circuit that determines a predetermined characteristic of the continuous light received by the light receiver;
 an authentication information database circuit that selects authentication information according to the determination by the continuous light determination circuit;
 an authentication execution circuit that executes a predefined authentication protocol based on the authentication information from the authentication information database circuit; and
 a terminal-side RF transmitter that transmits the authentication information from the authentication execution circuit by RF wireless.

Effects of the Invention

The wireless communication system, the wireless communication method, and the wireless terminal apparatus according to the present disclosure can ensure the limitation of the communication area, the safety of communication, and the stability of communication by utilizing the characteristics of optical wireless and RF wireless, and furthermore implement a wireless base station apparatus and a wireless terminal apparatus having simple configurations.

DESCRIPTION OF EMBODIMENTS

Hereinafter, embodiments of the present disclosure will be described in detail with reference to the drawings. Note that the present disclosure is not limited to the embodiments described below. These example embodiments are merely illustrations, and the present disclosure can be embodied with various modifications and improvements based on the knowledge of those skilled in the art. Note that in the present specification and the drawings, components having the same reference numeral shall indicate the same one.

An example embodiment of the present disclosure is shown below.

Figure 1:
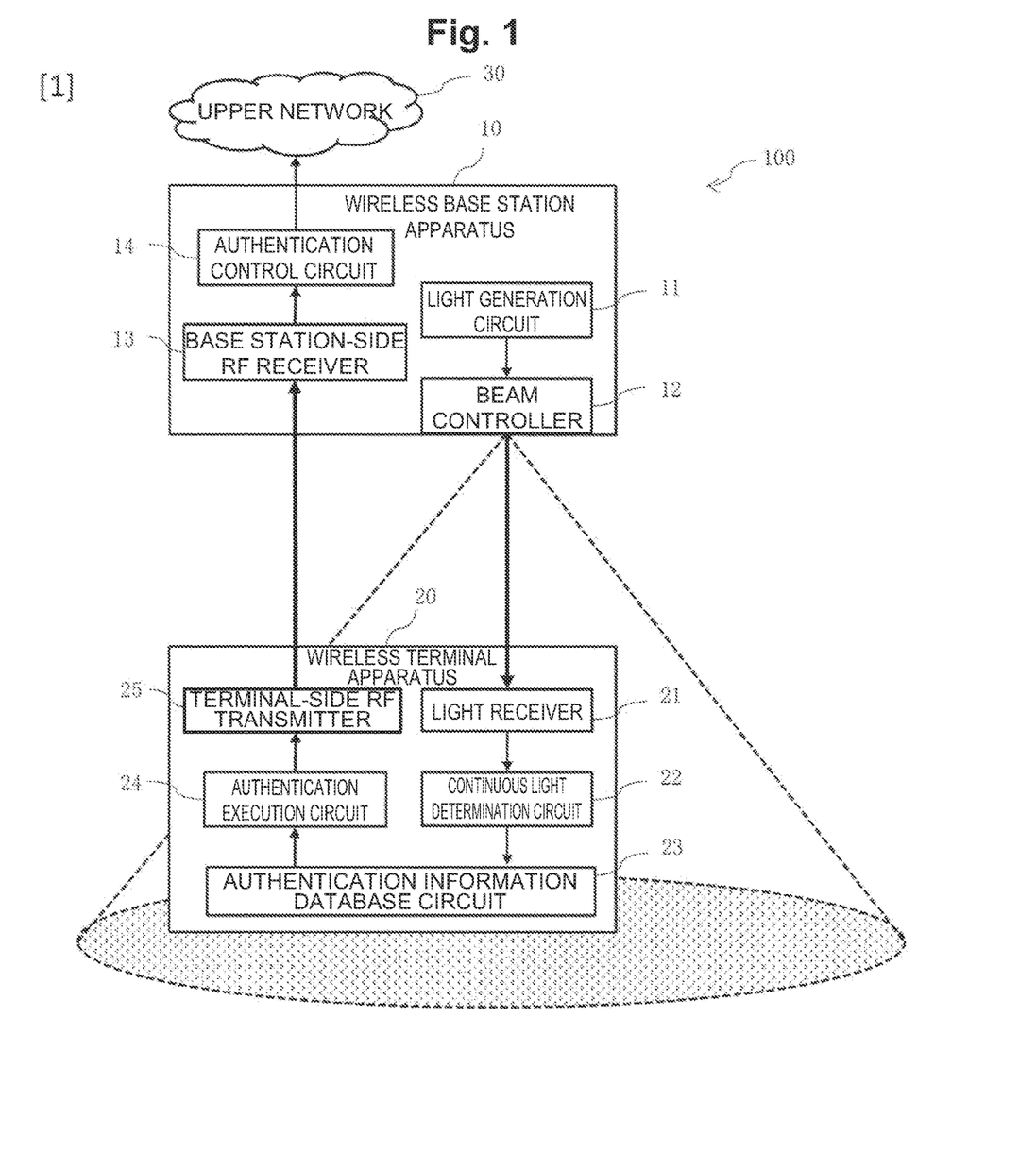
FIG. 1 is an example configuration of a wireless communication system according to the present disclosure.

FIG. 1 shows an example configuration of a wireless communication system according to this embodiment. A wireless communication system 100 of this embodiment includes: a wireless base station apparatus 10; and a wireless terminal apparatus 20 that performs RF wireless communication with the wireless base station apparatus 10 using continuous light from the wireless base station apparatus 10 for authentication.

The wireless base station apparatus 10 includes: a light generation circuit 11 that generates continuous light having a predetermined characteristic; a beam controller 12 that controls a beam shape of the continuous light from the light generation circuit 11, and sends out the continuous light into space; a base station-side RF receiver 13 that receives authentication information from the wireless terminal apparatus 20 by RF wireless; and an authentication control circuit 14 that permits information communication between the wireless terminal apparatus 20 and an upper network 30 when authenticating the wireless terminal apparatus 20 according to a predefined authentication protocol based on the authentication information from the base station-side RF receiver 13.

The wireless terminal apparatus 20 includes: a light receiver 21 that receives the continuous light from the beam controller 12; a continuous light determination circuit 22 that determines the predetermined characteristic of the continuous light received by the light receiver 21; an authentication information database circuit 23 that selects authentication information according to the determination by the continuous light determination circuit 22; an authentication execution circuit 24 that executes the predefined authentication protocol based on the authentication information from the authentication information database circuit 23; and a terminal-side RF transmitter 25 that transmits the authentication information from the authentication execution circuit 24 to the base station-side RF receiver 13 by RF wireless.

A wireless communication method according to this embodiment includes in the following order: a step of a wireless base station apparatus 10 generating continuous light having a predetermined characteristic, and controlling a beam shape of the generated continuous light and sending out the continuous light into space; a step of a wireless terminal apparatus 20 receiving the sent-out continuous light, determining the predetermined characteristic of the received continuous light, selecting authentication information according to the determination, executing a predefined authentication protocol based on the selected authentication information, and transmitting the selected authentication information to the wireless base station apparatus by RF wireless; and a step of the wireless base station apparatus 10 receiving the authentication information from the wireless terminal apparatus 20 by RF wireless, and permitting information communication between the wireless terminal apparatus 20 and an upper network 30 when authenticating the wireless terminal apparatus 20 according to the predefined authentication protocol based on the received authentication information.

Hereinafter, the operation of the wireless communication system will be described using FIG. 1. The light generation circuit 11 generates continuous light having predetermined characteristics. In this embodiment, continuous light means unmodulated light. Intensity changes and wavelength changes that are sufficiently slower than the modulation rate of the terminal-side RF transmitter 25 are included in continuous light as used in this embodiment. With continuous light, it is possible to eliminate the need for a high-speed modulation circuit or external modulator to implement a wireless base station apparatus having a simple configuration.

The wavelength of light generated by the light generation circuit 11 may be any wavelength as long as it is in the light wave range. Preferably, it is a wavelength in the ultraviolet range of 200 nm or higher and 350 nm or lower, or a wavelength in the near infrared range of 700 nm or higher and 2500 nm or lower. By setting the wavelength of light generated by the light generation circuit 11 to a wavelength that does not overlap with the wavelength of a normal illuminating light source, it is possible to reduce the influence of the illuminating light source on the light receiver 21.

The beam controller 12 shapes the beam of continuous light from the light generation circuit 11 to set the communicable area of this wireless communication system. This wireless communication system can ensure the limitation of the communication area and the safety of communication by utilizing the linearity of light waves. A reflector or a transparent refractive index body can be used for shaping the beam.

The light receiver 21 receives the light beam from the beam controller 12, and converts it into an electrical signal. For receiving light, it is sufficient to select a light receiving element according to the wavelength of light generated by the light generation circuit 11. Only when the wireless terminal apparatus 20 is within the communicable area set by the beam controller 12, the light receiver 21 can receive continuous light from the beam controller 12. Since a high-speed demodulation circuit is not required to receive continuous light, it is possible to implement a wireless terminal apparatus having a simple configuration. The intensity of continuous light may be calculated from the light receiving area of the light receiving element, the photoelectric conversion efficiency of the light receiving element from light to current or voltage, the inclination of the light receiving element with respect to the light beam, and the like. Furthermore, the illuminance of the irradiated surface may be calculated from the intensity of continuous light by utilizing the light receiving area of the light receiving element, the inclination of the light receiving element with respect to the light beam, and the like. In order for the light receiver 21 to receive light at a specific wavelength, the wavelength may be selected by a filter that reflects or transmits light at a specific wavelength.

The continuous light determination circuit 22 determines the predetermined characteristics of continuous light received by the light receiver 21. The characteristics includes the intensity, wavelength and the like of continuous light. From the intensity and wavelength, it is determined which of predetermined characteristics they are.

The authentication information database circuit 23 holds a correspondence table between the predetermined characteristics of continuous light and authentication information corresponding thereto as an authentication information database, and selects authentication information that matches the characteristics determined by the continuous light determination circuit 22 with reference to the authentication information database. Furthermore, the authentication information database circuit 23 outputs the selected authentication information to the authentication execution circuit 24. The authentication execution circuit 24 executes a predefined authentication protocol, and transmits the authentication information to the wireless base station apparatus 10 through the terminal-side RF transmitter 25. Examples of the authentication protocol include protocols established by IEEE 802.11 and Wi-Fi Alliance.

The terminal-side RF transmitter 25 transmits information necessary for executing the authentication protocol including the authentication information using RF wireless. The diffusivity of radio waves can be used for transmission of the authentication information and information communication after authentication to ensure the stability of communication.

The base station-side RF receiver 13 receives the authentication information from the terminal-side RF transmitter 25 by RF wireless, and outputs it to the authentication control circuit 14. The authentication control circuit 14 authenticates the wireless terminal apparatus 20 according to the predefined authentication protocol based on the authentication information from the base station-side RF receiver 13. Examples of the authentication protocol include protocols established by IEEE 802.11 and Wi-Fi Alliance. If the authentication information corresponding to the characteristics of continuous light generated by the light generation circuit 11 matches the authentication information from the base station-side RF receiver 13, the authentication control circuit 14 permits information communication between the wireless terminal apparatus 20 and the upper network 30. An authentication protocol required to start and maintain communication such as Wi-Fi communication is executed between the authentication execution circuit 24 and the authentication control circuit 14. The safety of communication can be ensured by providing an RF/optical wireless hybrid-type wireless communication system. For information communication after authentication, the wireless terminal apparatus 20 may further include a terminal-side RF receiver, and the wireless base station apparatus 10 may further include a base station-side RF transmitter.

The light generation circuit 11 may set the predetermined characteristics to be fixed or variable. When it set to be variable, the authentication control circuit 14 includes an authentication information database similarly to the wireless terminal apparatus 20, selects characteristics of continuous light corresponding to authentication information, and outputs the selected characteristics of continuous light to the light generation circuit 11, and the light generation circuit 11 generates continuous light having the predetermined characteristics.

It is desirable that the continuous light determination circuit 22 performs a determination operation at the start of information communication. This is for ensuring the safety of communication. Further, even if the optical wireless is disconnected after the determination operation, it is possible to stably communicate information by RF wireless between the wireless base station apparatus 10 and the wireless terminal apparatus 20. The continuous light determination circuit 22 may perform the determination operation periodically or constantly. By blocking information communication when the wireless terminal apparatus 20 moves out of the beam from the beam controller 12, it becomes easy to ensure the safety of communication. The continuous light determination circuit 22 may perform the determination operation only within a preset time slot, for example, for 10 seconds. By limiting the time, it becomes easy to ensure the safety of communication.

Another example embodiment of the present disclosure is shown below.

Figure 2:
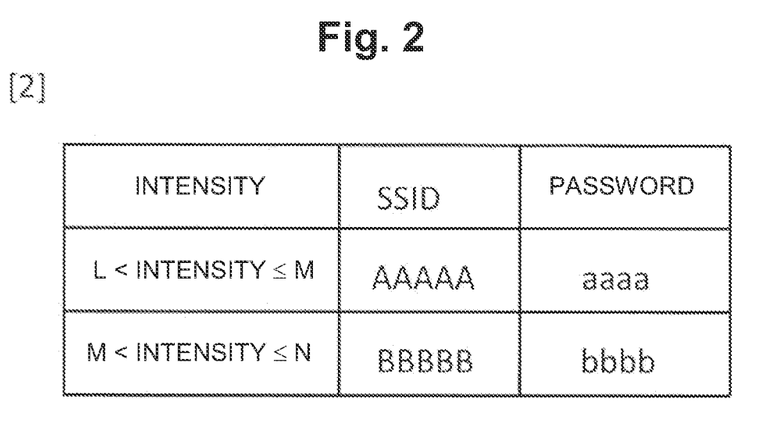
FIG. 2 shows an example of correspondence between the characteristics of continuous light generated by a light generation circuit and authentication information according to the present disclosure.

FIG. 2 shows an example of correspondence between the characteristics of continuous light generated by the light generation circuit and the authentication information according to the present disclosure. In a wireless communication system of this embodiment, the light generation circuit 11 sends out continuous light at a predetermined intensity, and the continuous light determination circuit 22 determines the intensity of the continuous light received by the light receiver 21. The authentication information database circuit 23 selects authentication information corresponding to the intensity of the continuous light determined by the authentication information determination circuit.

The continuous light determination circuit 22 may determine the intensity of continuous light in consideration of the output of continuous light generated by the light generation circuit 11, the illuminance of continuous light from the beam controller 12, the light receiving area of the light receiver 21, the light receiving efficiency of the light receiver 21, and the like. The same applies to the following embodiments.

In FIG. 2, SSIDs and passwords are taken as examples of authentication information. The continuous light determination circuit 22 determines which of the intensities shown in FIG. 2 the intensity of the continuous light received by the light receiver 21 is. For example, when the continuous light determination circuit 22 determines that the intensity is greater than L and less than or equal to M, the authentication information database circuit 23 selects "AAAAA" as the SSID and "aaaa" as the password. When the continuous light determination circuit 22 determines that the intensity is greater than M and less than or equal to N, the authentication information database circuit 23 selects "BBBBB" as the SSID and "bbbb" as the password. The authentication information database circuit 23 outputs the selected SSID and password to the authentication execution circuit 24 as authentication information. The authentication execution circuit 24 executes the authentication protocol with the authentication control circuit 14.

Although it is determined whether "the intensity is greater than L and less than or equal to M" in FIG. 2, it may be determined whether "the intensity is less than or equal to M". Further, although it is determined whether "the intensity is greater than M and less than or equal to N", it may be determined whether "the intensity is greater than M".

Although SSIDs and passwords are listed as authentication information in FIG. 2, PMKs (pairwise master keys), BSSIDs (basuic SSIDs), ESSIDs (extended SSIDs), and channels may be used instead of or together with them. The same applies to the following embodiments.

If the authentication information corresponding to the intensity of the continuous light sent out by the light generation circuit 11 matches the authentication information output by the base station-side RF receiver 13, the authentication control circuit 14 authenticates the wireless terminal apparatus 20, and permits information communication between the wireless terminal apparatus 20 and the upper network 30.

According to this embodiment, it is possible to implement a light generation circuit and a continuous light determination circuit having simple configurations.

Another example embodiment of the present disclosure is shown below.

Figure 3:
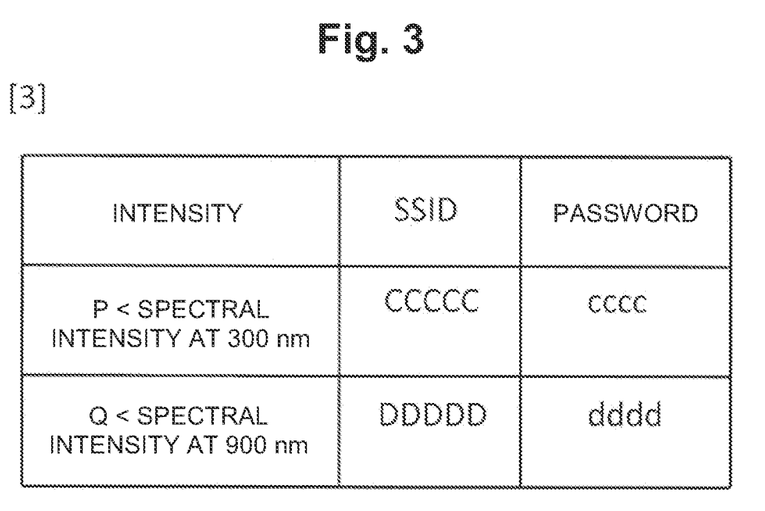
FIG. 3 shows an example of correspondence between the characteristics of continuous light generated by the light generation circuit and authentication information according to the present disclosure.

FIG. 3 shows an example of correspondence between the characteristics of continuous light generated by the light generation circuit and the authentication information according to the present disclosure. In a wireless communication system of this embodiment, the light generation circuit 11 sends out continuous light at a predetermined intensity at a predetermined wavelength, and the continuous light determination circuit 22 determines the wavelength and intensity of the continuous light received by the light receiver 21. The authentication information database circuit 23 selects authentication information corresponding to the wavelength and intensity of the continuous light determined by the continuous light determination circuit.

In FIG. 3, SSIDs and passwords are taken as examples of authentication information. The continuous light determination circuit 22 determines which of wavelengths and intensities at the wavelengths shown in FIG. 2 the intensity of the continuous light received by the light receiver 21 corresponds to. For example, when the continuous light determination circuit 22 determines that the intensity is greater than P at a wavelength of 300 nm, the authentication information database circuit 23 selects "CCCCC" as the SSID and "cccc" as the password. When the continuous light determination circuit 22 determines that the intensity is greater than Q at a wavelength of 900 nm, the authentication information database circuit 23 selects "DDDDD" as the SSID and "dddd" as the password. The authentication information database circuit 23 outputs the selected SSID and password to the authentication execution circuit 24 as authentication information. The authentication execution circuit 24 executes the authentication protocol with the authentication control circuit 14.

Although it is determined whether "the intensity is greater than P" in FIG. 3, it may be determined whether "the intensity is greater than P1 and less than or equal to P2". Further, although it is determined whether "the intensity is greater than Q", it may be determined whether "the intensity is greater than Q1 and less than or equal to Q2".

Although wavelengths of 300 nm and 900 nm are taken as examples in FIG. 3, wavelengths in the ultraviolet range of 200 nm or higher and 350 nm or lower, or wavelengths in the near infrared range of 700 nm or higher and 2500 nm or lower is desirable. By setting the wavelength of light generated by the light generation circuit 11 to a wavelength that does not overlap with the wavelength of a normal illuminating light source, it is possible to reduce the influence of the illuminating light source on the light receiver 21. Alternatively, it may be a wavelength of visible light. This facilitates visual confirmation.

If the authentication information corresponding to the wavelength and intensity of the continuous light sent out by the light generation circuit 11 matches the authentication information output by the base station-side RF receiver 13, the authentication control circuit 14 authenticates the wireless terminal apparatus 20, and permits information communication between the wireless terminal apparatus 20 and the upper network 30.

According to this embodiment, it is possible to implement a light generation circuit and a continuous light determination circuit with high authentication accuracy in simple configurations.

Another example embodiment of the present disclosure is shown below.

Figure 4:
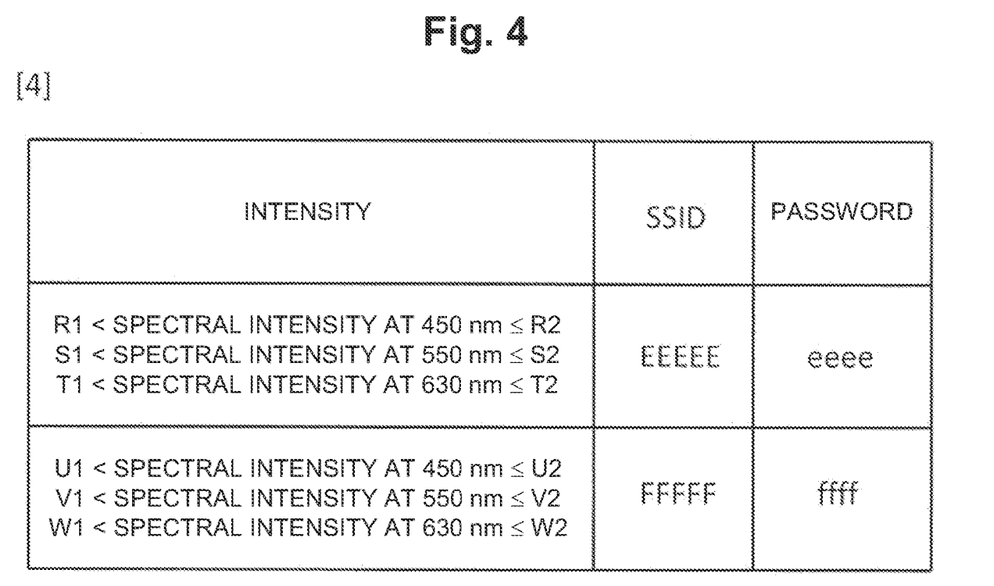
FIG. 4 shows an example of correspondence between the characteristics of continuous light generated by the light generation circuit and authentication information according to the present disclosure.

FIG. 4 shows an example of correspondence between the characteristics of continuous light generated by the light generation circuit and the authentication information according to the present disclosure. In a wireless communication system of this embodiment, the light generation circuit 11 sends out continuous light at predetermined intensities at a plurality of predetermined wavelengths, and the continuous light determination circuit 22 determines the plurality of wavelengths and intensities of the continuous light received by the light receiver 21. The authentication information database circuit 23 selects authentication information corresponding to the plurality of wavelengths and intensities of the continuous light determined by the continuous light determination circuit.

In FIG. 4, SSIDs and passwords are taken as examples of authentication information. The continuous light determination circuit 22 determines which combination of a plurality of wavelengths and intensities at the wavelengths shown in FIG. 4 the intensity of the continuous light received by the light receiver 21 corresponds to. For example, when the continuous light determination circuit 22 determines that the intensity is greater than R1 and less than or equal to R2 at a wavelength of 450 nm, the intensity is greater than S1 and less than or equal to S2 at a wavelength of 550 nm, and the intensity is greater than T1 and less than or equal to T2 at a wavelength of 630 nm, the authentication information database circuit 23 selects "EEEEE" as the SSID and "eeee" as the password. When the continuous light determination circuit 22 determines that the intensity is greater than U1 and less than or equal to U2 at a wavelength of 450 nm, the intensity is greater than V1 and less than or equal to V2 at a wavelength of 550 nm, and the intensity is greater than W1 and less than or equal to W2 at a wavelength of 630 nm, the authentication information database circuit 23 selects "FFFFF" as the SSID and "ffff" as the password. The authentication information database circuit 23 outputs the selected SSID and password to the authentication execution circuit 24 as authentication information. The authentication execution circuit 24 executes the authentication protocol with the authentication control circuit 14.

Although wavelengths of visible light are taken as an example in FIG. 4, a wavelength in the ultraviolet range of 200 nm or higher and 350 nm or lower, or a wavelength in the near infrared range of 700 nm or higher and 2500 nm or lower is desirable. By setting the wavelength of light generated by the light generation circuit 11 to a wavelength that does not overlap with the wavelength of a normal illuminating light source, it is possible to reduce the influence of the illuminating light source on the light receiver 21.

Although it is determined whether "the intensity is greater than R1 and less than or equal to R2" in FIG. 4, it may be determined whether "the intensity is greater than R1". Alternatively, it may be determined whether "the intensity is less than or equal to R2". The same applies to other spectral intensities.

If the authentication information corresponding to the plurality of wavelengths and intensities of the continuous light sent out by the light generation circuit 11 matches the authentication information output by the base station-side RF receiver 13, the authentication control circuit 14 authenticates the wireless terminal apparatus 20, and permits information communication between the wireless terminal apparatus 20 and the upper network 30.

According to this embodiment, it is possible to implement a light generation circuit and a continuous light determination circuit with high authentication accuracy in simple configurations.

Another example embodiment of the present disclosure is shown below.

Figure 5:
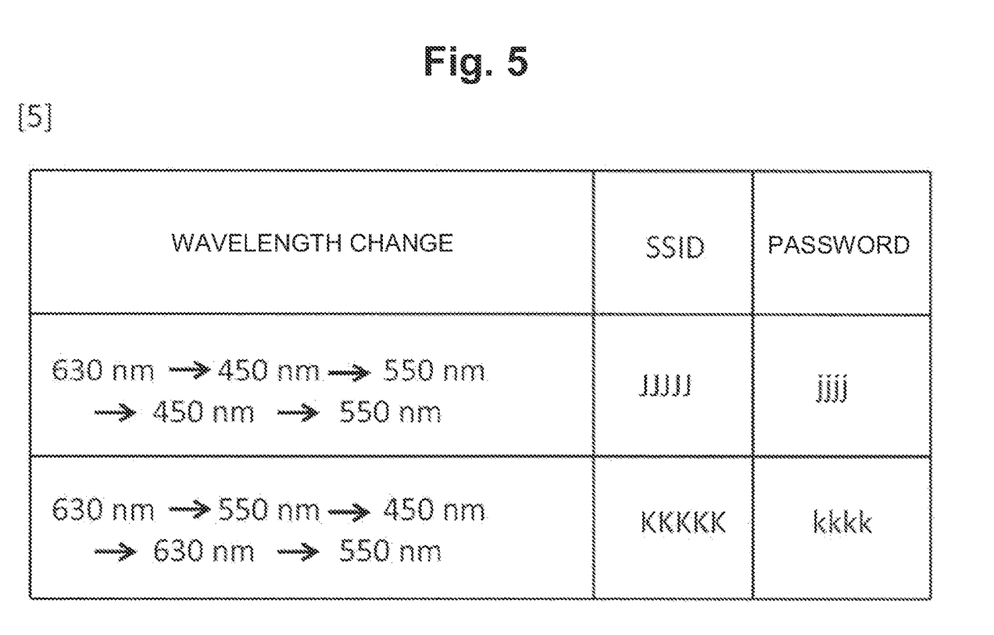
FIG. 5 shows an example of correspondence between the characteristics of continuous light generated by the light generation circuit and authentication information according to the present disclosure.

FIG. 5 shows an example of correspondence between the characteristics of continuous light generated by the light generation circuit and the authentication information according to the present disclosure. In a wireless communication system of this embodiment, the light generation circuit 11 sends out continuous light whose wavelength changes in a predetermined pattern, and the continuous light determination circuit 22 determines the pattern of change of the wavelength of the continuous light received by the light receiver 21. The authentication information database circuit 23 selects the authentication information corresponding to the pattern of change of the wavelength of the continuous light determined by the continuous light determination circuit.

In FIG. 5, SSIDs and passwords are taken as examples of authentication information. The continuous light determination circuit 22 determines in which pattern shown in FIG. 5 the wavelength of the continuous light received in the light receiver 21 changes. For example, when the continuous light determination circuit 22 determines that the wavelength of the continuous light changes from 630 nm to 450 nm to 550 nm to 450 nm to 550 nm, the authentication information database circuit 23 selects "JJJJJ" as the SSID and "jjjj" as the password. When the continuous light determination circuit 22 determines that the wavelength of the continuous light changes from 630 nm to 550 nm to 450 nm to 630 nm to 550 nm, the authentication information database circuit 23 selects "KKKKK" as the SSID and "kkkk" as the password. The authentication information database circuit 23 outputs the selected SSID and password to the authentication execution circuit 24 as authentication information. The authentication execution circuit 24 executes the authentication protocol with the authentication control circuit 14.

Although wavelengths of visible light are taken as an example in FIG. 5, a wavelength in the ultraviolet range of 200 nm or higher and 350 nm or lower, or a wavelength in the near infrared range of 700 nm or higher and 2500 nm or lower may be used. By setting the wavelength of light generated by the light generation circuit 11 to a wavelength that does not overlap with the wavelength of a normal illuminating light source, it is possible to reduce the influence of the illuminating light source on the light receiver 21.

If the authentication information corresponding to the pattern of change of the wavelength of the continuous light sent out by the light generation circuit 11 matches the authentication information output by the base station-side RF receiver 13, the authentication control circuit 14 authenticates the wireless terminal apparatus 20, and permits information communication between the wireless terminal apparatus 20 and the upper network 30.

According to this embodiment, it is possible to implement a light generation circuit and a continuous light determination circuit with high authentication accuracy in simple configurations.

A part of the apparatuses of the present invention such as the continuous light determination circuit 22, the authentication information database circuit 23, the authentication execution circuit 24, and the authentication control circuit 14 can also be implemented by a computer and a program, and it is also possible to record the program on a recording medium, and provide it through a network.

INDUSTRIAL APPLICABILITY

The present disclosure can be applied to the information and communication industry.

REFERENCE SIGNS LIST

10 Wireless base station apparatus
11 Light generation circuit
12 Beam controller
13 Base station-side RF receiver
14 Authentication control circuit
20 Wireless terminal apparatus
21 Light receiver
22 Continuous light determination circuit
23 Authentication information database circuit
24 Authentication execution circuit
25 Terminal-side RF transmitter
100 Wireless communication system

The invention claimed is:

1. A wireless communication system comprising:
a wireless base station apparatus; and
a wireless terminal apparatus that performs RF wireless communication with the wireless base station apparatus using continuous light from the wireless base station apparatus for authentication,
wherein the wireless base station apparatus comprises:
a light generation circuit that generates continuous light having a predetermined characteristic;
a beam controller that controls a beam shape of the continuous light from the light generation circuit, and sends out the continuous light into space;
a base station-side RF receiver that receives authentication information from the wireless terminal apparatus by RF wireless; and
an authentication control circuit that permits information communication between the wireless terminal apparatus and an upper network when authenticating the wireless terminal apparatus according to a predefined authentication protocol based on the authentication information from the base station-side RF receiver, and
the wireless terminal apparatus comprises:
a light receiver that receives the continuous light from the beam controller;
a continuous light determination circuit that determines the predetermined characteristic of the continuous light received by the light receiver;
an authentication information database circuit that selects authentication information according to the determination by the continuous light determination circuit;
an authentication execution circuit that executes the predefined authentication protocol based on the authentication information from the authentication information database circuit; and
a terminal-side RF transmitter that transmits the authentication information from the authentication execution circuit to the base station-side RF receiver by RF wireless.

2. The wireless communication system according to claim 1, wherein
the light generation circuit sends out continuous light at a predetermined intensity, the continuous light determination circuit determines intensity of the continuous light received by the light receiver, and the authentication information database circuit selects authentication information corresponding to the intensity of the continuous light determined by the continuous light determination circuit.

3. The wireless communication system according to claim 1, wherein the light generation circuit sends out continuous light at a predetermined intensity at a predetermined wavelength, the continuous light determination circuit determines a wavelength and intensity of the continuous light received by the light receiver, and the authentication information database circuit selects authentication information corresponding to the wavelength and intensity of the continuous light determined by the continuous light determination circuit.

4. The wireless communication system according to claim 1, wherein the light generation circuit sends out continuous light at a predetermined intensity at a plurality of predetermined wavelengths, the continuous light determination circuit determines a plurality of wavelengths and intensity of the continuous light received by the light receiver, and the authentication information database circuit selects authentication information corresponding to the plurality of wavelengths and intensity of the continuous light determined by the continuous light determination circuit.

5. The wireless communication system according to claim 1, wherein the light generation circuit sends out continuous light whose wavelength changes in a predetermined pattern, the continuous light determination circuit determines a pattern of change of a wavelength of the continuous light received by the light receiver, and the authentication information database circuit selects authentication information corresponding to the pattern of change of the wavelength of the continuous light determined by the continuous light determination circuit.

6. The wireless communication system according to claim 1, wherein the continuous light determination circuit determines the predetermined characteristic of the continuous light within a preset time slot.

7. A wireless communication method comprising in the following order:

a step of a wireless base station apparatus generating continuous light having a predetermined characteristic, and controlling a beam shape of the generated continuous light and sending out the continuous light into space;

a step of a wireless terminal apparatus receiving the sent-out continuous light, determining the predetermined characteristic of the received continuous light, selecting authentication information according to the determination, executing a predefined authentication protocol based on the selected authentication information, and transmitting the selected authentication information to the wireless base station apparatus by RF wireless; and a step of the wireless base station apparatus receiving the authentication information from the wireless terminal apparatus by RF wireless, and permitting information communication between the wireless terminal apparatus and an upper network when authenticating the wireless terminal apparatus according to the predefined authentication protocol based on the received authentication information.

8. A wireless terminal apparatus comprising:

a light receiver that receives continuous light from space;

a continuous light determination circuit that determines a predetermined characteristic of the continuous light received by the light receiver;

an authentication information database circuit that selects authentication information according to the determination by the continuous light determination circuit;

an authentication execution circuit that executes a predefined authentication protocol based on the authentication information from the authentication information database circuit; and a terminal-side RF transmitter that transmits the authentication information from the authentication execution circuit by RF wireless.

* * * * *